United States Patent

[11] 3,545,558

[72] Inventor Murrel C. Maugh
2537 Wood Ave., Eugene, Oregon 97402
[21] Appl. No. 761,102
[22] Filed Sept. 20, 1968
[45] Patented Dec. 8, 1970

[54] HYDRAULIC LOAD WEIGHING SCALE AND MOUNTING THEREFOR
17 Claims, 8 Drawing Figs.

[52] U.S. Cl. ................................................. 177/208, 177/141
[51] Int. Cl. ................................................. G01g 5/04, G01g 19/10
[50] Field of Search ........................................ 177/208, 209, 141

[56] References Cited
UNITED STATES PATENTS

| | | | |
|---|---|---|---|
| 1,623,414 | 4/1927 | Jensen | 177/208X |
| 2,652,241 | 9/1953 | Williams | 177/208 |
| 2,826,404 | 3/1958 | Stigum | 177/141 |
| 2,867,432 | 1/1959 | Barker et al. | 177/141 |
| 2,960,328 | 11/1960 | Tate | 177/208UX |
| 2,981,101 | 4/1961 | Buck | 177/208X |
| 3,145,795 | 8/1964 | Tate | 177/208 |
| 3,261,417 | 7/1966 | Golding | 177/208 |

FOREIGN PATENTS

| | | | |
|---|---|---|---|
| 153,012 | 8/1953 | Australia | 177/209 |
| 806,967 | 10/1936 | France | 177/208 |
| 648,306 | 7/1937 | Germany | 177/208 |
| 364,686 | 1/1932 | Great Britain | 177/208 |
| 570,584 | 12/1957 | Italy | 177/208 |
| 2,596 | 12/1918 | Netherlands | 177/208 |

Primary Examiner—Robert S. Ward, Jr.
Attorney—Oliver D. Olson

ABSTRACT: A hydraulic load weighing scale, comprising upper and lower plates sealed together peripherally and containing hydraulic fluid between them, is mounted between upper and lower relatively movable members of a vehicle by means of a universal connecter. The weighing scale is compensated for temperature variations by the arrangement wherein the maximum thickness of at least one of the scale plates is established by the ratio $T^2 = \frac{A}{K}$ wherein $A$ is the area of the plate subjected to hydraulic pressure and $K$ is a constant ranging between 400 and 600, preferably about 450.

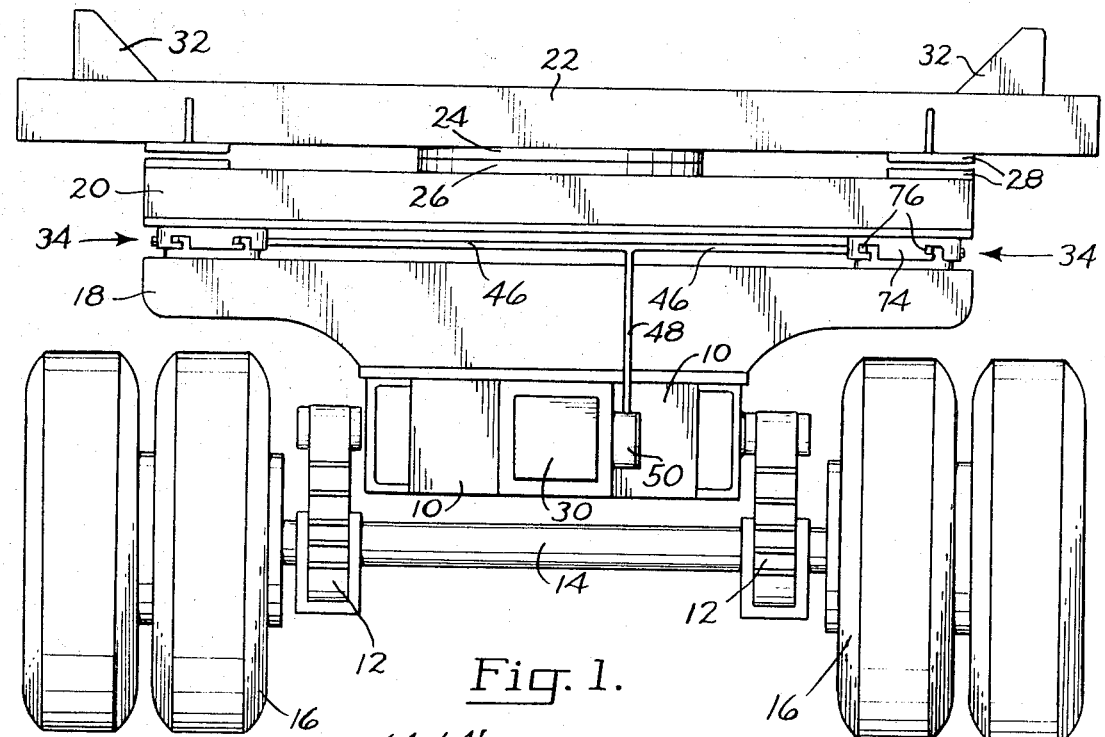
Fig. 1.
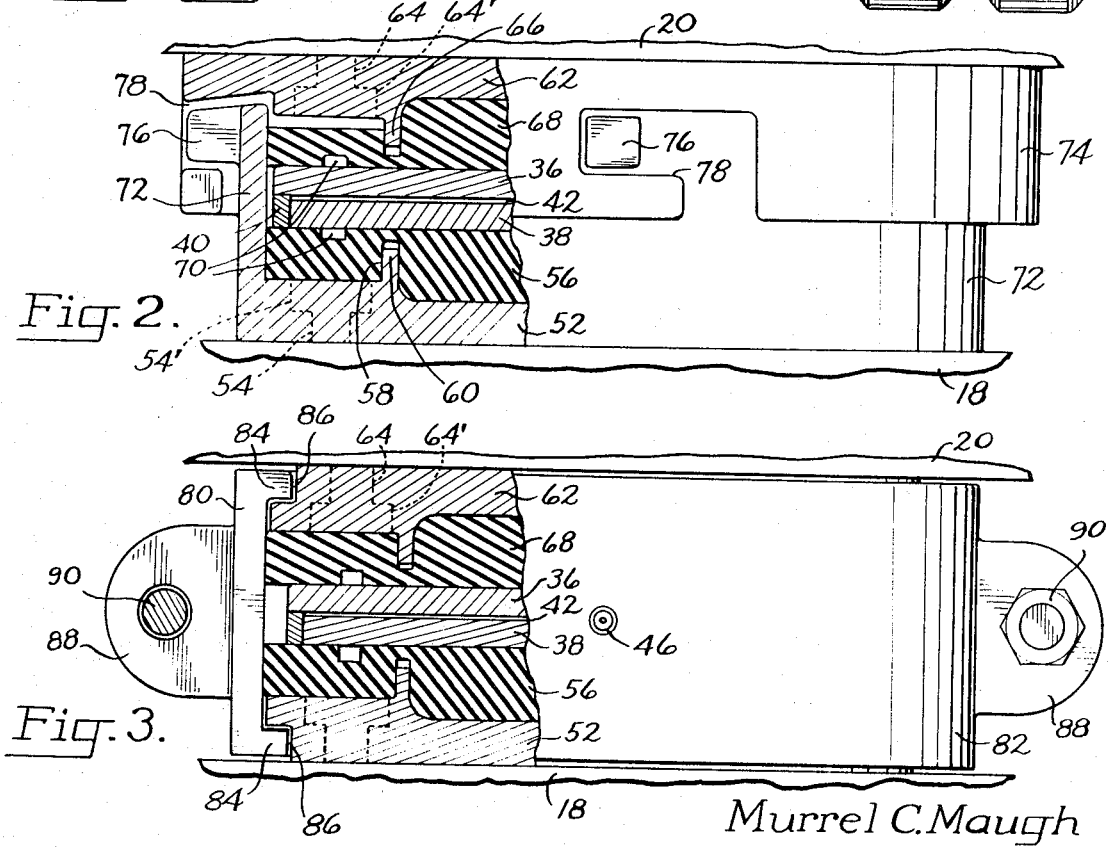
Fig. 2.
Fig. 3.
Murrel C. Maugh
INVENTOR

Murrel C. Maugh
INVENTOR
BY
Agent

HYDRAULIC LOAD WEIGHING SCALE AND MOUNTING THEREFOR

BACKGROUND OF THE INVENTION

This invention relates to hydraulic load weighing scales of the type disclosed in my U.S. Reissue Letters Pat. No. 24,200 and more particularly to universal means for mounting such scales between spaced relatively movable members of a vehicle, to eliminate stresses on the scales as the vehicle members move relative to each other and to permit use of scale plates of predetermined thickness to minimize the effect of atmospheric temperature changes on load weight measurements.

Prior scales of the type described heretofore have had their plates secured directly to the upper and lower relatively movable members of a vehicle by such means as studs secured to and projecting from the scale plates. Relative movement between the vehicle members thus imposes stresses on the plates, through the studs. In some instances the stresses are sufficient to warp the scale plates to an extent which reduces the accuracy of weight measurements. In other instances the stresses are sufficient to break the studs and thus disconnect the vehicle members from each other. To minimize these problems, the scale plates have been made quite thick, thereby resulting in further inaccuracies of load measurements due to variation in atmospheric temperature.

SUMMARY OF THE INVENTION

In its basic concept, the present invention provides a universal connecter by which to mount a hydraulic scale of the type described between spaced, relatively movable members of a vehicle, thereby allowing the scale to be constructed of plates of minimum thickness.

Another important object of this invention is the provision of a hydraulic load weighing scale and mounting therefor which are of simplified construction for economical manufacture, which are capable of installation with speed and facility and which have long service life with minimum maintenance and repair.

The foregoing and other objects and advantages of the present invention will appear from the following detailed description taken in connection with the accompanying drawings of the preferred embodiments.

BRIEF DESCRIPTION OF THE DRAWINGS

FIG. 1 is an end view of a logging trailer having associated therewith a cooperating pair of hydraulic scales and mounting means therefor, embodying the features of this invention.

FIG. 2 is a fragmentary side elevation, partly in section, of one of the hydraulic load weighing scales and mounting therefor illustrated in FIG. 1.

FIG. 3 is a side elevation, the side elevation, partly in section, of a modified form of mounting.

DESCRIPTION OF THE PREFERRED EMBODIMENT

Figure 4:
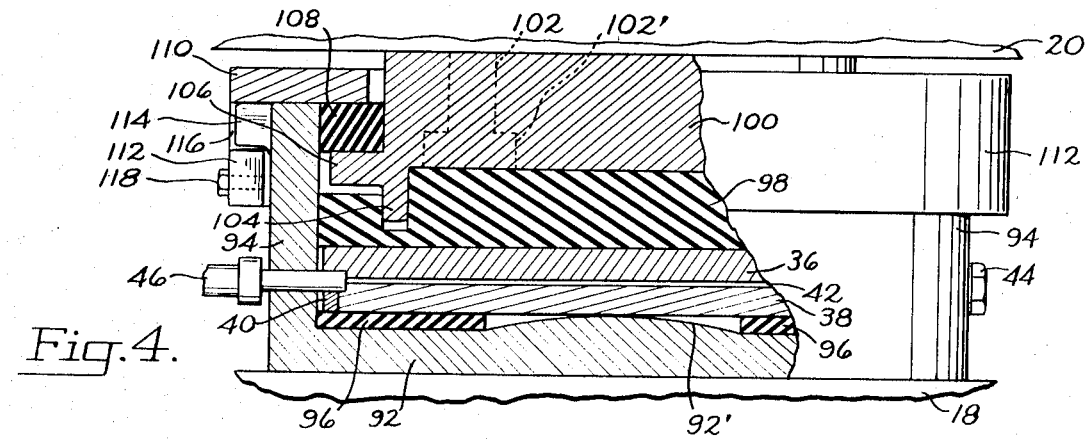
FIG. 4 is a fragmentary side elevation, partly in section, of a still further modified form of scale mounting.

Referring to FIG. 1 of the drawings, there is shown for purposes of illustration a conventional logging trailer comprising the main structural frame 10 mounting resiliently by springs 12 upon a pair of axles 14 which are supported by wheels 16. A transverse frame 18 is secured upon the main frame and functions as a support for the fixed bunk 20 which is mounted thereon in the manner described in detail hereinafter.

A swinging bunk 22 is mounted rotatably upon the fixed bunk by the cooperating pivot disks 24 and 26. These disks are secured to the fixed bunk and swinging bunk, respectively, and are maintained in proper superimposed alinement by a kingbolt (not shown) which extends through the center of said disks and is secured to the said bunks. Rub pads 28 are secured to the fixed and swinging bunks adjacent their respective ends to form spaced pairs which limit the degree of lateral tipping of the swinging bunk with respect to the fixed bunk.

The trailer assembly just described is connected to a truck or trailer by means of the reach 30. Logs may then be supported between the swinging bunks of the trailer and tractor and secured within the confines of the laterally spaced chocks 32. The foregoing arrangement is of conventional construction well known to those skilled in the art and does not form a part of the present invention.

The fixed bunk is mounted upon the transverse frame in spaced relation to the latter by means of a pair of scale assemblies designed generally by the reference number 34. As best illustrated in FIGS. 2—5, each scale is constructed of a pair of superimposed plates 36 and 38 secured together about their peripheries by such means as welding 40. A threaded inlet opening is provided in the periphery of the plates, communicating with the interior space 42 between the plates. A threaded outlet opening also is provided in the periphery of the plates and is normally closed with a plug 44 (FIG. 5). The outlet opening serves to bleed air from the conduits and spaces between scale plates, during filling with hydraulic fluid.

A hydraulic conduit 46 is connected at its opposite ends to the inlet openings of the pair of scales. A branch conduit 48 connects the conduit to a fluid pressure-responsive gage 50 of the type described in my earlier patent identified hereinbefore. The scale system requires prepressurization with hydraulic fluid, in the same manner as fully described in my earlier patent.

As explained hereinbefore, variations in atmospheric temperature contribute adversely to the accuracy of load weight measurements. I have discovered that this effect is minimized by reducing the thickness of the scale plates to a minimum, while maintaining sufficient thickness for adequate structural strength for a given installation. Thus, the scale plates need to be thicker for applications in which the scale is to weigh heavier loads. However, I have found that the effect of temperature variations is minimized by relating the thickness of the scale plates to the area of the plates which is subjected to hydraulic pressure, by the ratio $T^2 = \dfrac{A}{K}$ wherein T is the thickness of the plate, A is the area of the plate subjected to hydraulic pressure, and K is a constant which ranges between about 400 and about 600, preferably about 450.

Plate thicknesses determined by the foregoing ratio have been found to represent the maximum thickness for that area of plate which provides sufficient structural strength for the application of the scale while providing minimum load measurement variation over a considerable range of variation in atmospheric temperature.

I have also found that, although it is desirable that both scale plates be of equal thickness, one of the plates may be thicker for a given area than dictated by the foregoing ratio.

To illustrate the foregoing, if the area of the plate subjected to hydraulic pressure is about 65 square inches, the maximum thickness of the plate may be about ⅜ inch; if the area is about 112 square inches the thickness may be about one-half inch; if the area is about 250 square inches the thickness may be about three-quarters inch. For structural strength sufficient for use of the scales on vehicles, it is considered that the plates should be at least one-quarter inch in thickness. In accordance with the foregoing ratio, the operative area of such a plate should not exceed about 28 square inches.

In order to minimize the stress imposed on the scale plates due to the relative movement of frame members of a vehicle, the present invention provides universal connecter means for mounting the scale between such relative movable members. The drawings illustrate various structural forms of such a connecter.

Referring first to FIGS. 1 and 2, the connecter includes a bottom plate member 52 adapted to be secured to the bottom, relatively movable member 18 of a vehicle. This may be done by welding, bolting, or other suitable means. In the embodiment illustrated, the plate members provided with a plurality of spaced openings 54 for the reception of securing bolts, the openings including an inner, hexagonal or other noncircular portion 54' adapted to receive the corresponding shaped head of the bolt. The bolts extend downward through registering openings in the vehicle frame member 18, and receive securing nuts, as will be understood.

Supported freely on the plate member is a disk 56 of rubber or other suitably resilient material. This is retained in position by means of an annular groove 58 in the disk which receives the upstanding annular rib 60 on the plate member. The disk serves as means to transfer load pressure from the member 18 to the lower plate 38 of the scale pad.

The connecter also includes an upper plate member 62 similarly provided with spaced bolt openings 64, 64' and annular rib 66. The latter is received in an annular groove in the associated resilient disk 68 which functions in the manner of disk 56 to transfer load pressure from member 20 to scale plate 36.

Interposed between the resilient disks is a scale pad of the previously described construction. To prevent relative displacement of the scale pad and resilient disks a plurality of tabs 70 may be provided on the scale plates to project outward therefrom for reception in pockets provided in the resilient disks.

The bottom plate member 52 is provided with an upstanding extending circular wall 72 within which the resilient disks and scale pad are freely confined. The upper plate member 62 is provided with a downwardly projecting circular wall 74 which telescopes freely over the wall 72 of the bottom plate member. The latter wall is provided with a plurality of circumferentially spaced, outwardly projecting lugs 76. The wall of the upper plate member is provided with a plurality of correspondingly spaced offset locking notches 78 adapted to removably receive the locking lugs, by relative rotation of the top and bottom plate members.

The lugs are smaller in dimension than the associated notches, whereby to permit a limited degree of relative movement of the top and bottom plate members. This permits sufficient relative movement of the vehicle frame members, as well as deflection of the resilient disks and scale plates, for proper operation of the scale. Further, this degree of universal movement of interconnected plate members minimizes stresses on the scale plates, there by permitting the latter to be made in minimum thickness, as described hereinbefore.

Still further, the enclosure of the scale pad with the walled plate members and with the resilient disks, serves to insulate the scale pad and thus further minimize the effects of changes in atmospheric temperature.

In the embodiment illustrated in FIGS. 1 and 2, the inlet conduit 46 and outlet plug 44 extend freely through openings in the wall 72 of the bottom plate member and registering, circumferentially elongated slots in the wall 74 of the top plate member. The slots accommodate relative rotational movement of the top plate member during locking and unlocking.

The form of connecter illustrated in FIG. 3 differs from that shown in FIG. 2 in that the circular walls and locking means of FIG. 2 are replaced by a pair of semicircular collars 80 and 82 provided with vertically spaced flanges 84. These flanges project inward for reception in annular grooves 86 provided in the peripheries of the plate members. Outwardly projecting tabs 88 on the adjacent ends of the collars have registering openings for the removable reception of connecting bolts 90, for securing the pair of collars together. The flanges are spaced apart sufficiently to provide the required degree of relative universal movement of the plate members, as will be understood. Openings in the collars freely receive therethrough the inlet conduit 46 and outlet plug 44.

Figure 5:
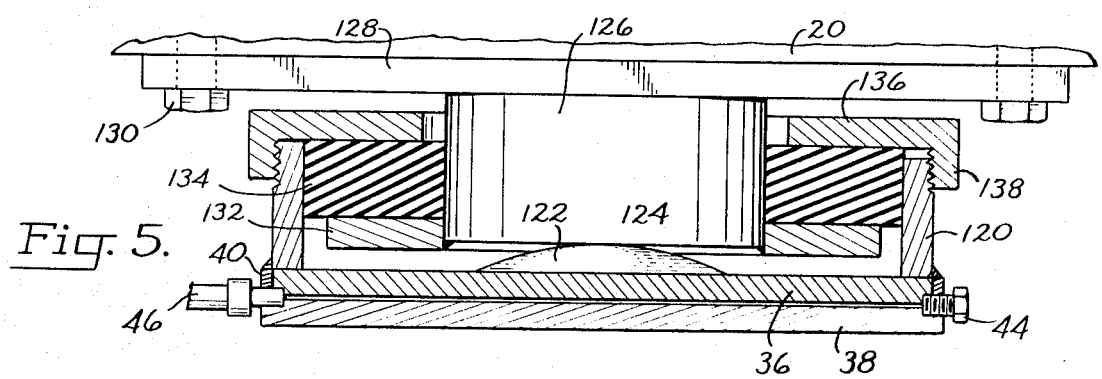
FIG. 5 is a fragmentary vertical section of still another form of scale mounting.

The connecter illustrated in FIG. 4 includes a bottom plate member 92 having an upstanding circular wall 94. The central portion 92' of the bottom plate member is formed as a segment of a sphere which projects upward for supporting the central portion of the lower plate of the scale pad and for transferring load pressure from member 18 to scale plate 38. The outer portion of the scale plate is supported by an annular resilient ring 96. A resilient disk 98 overlies the upper plate 36 of the scale pad and supports the upper plate member 100. This plate member is provided with a plurality of spaced openings 102, 102' for securing bolts, in the manner previously described, and also is provided with an annular rib 104 which is received freely in an annular groove in the resilient disk 98.

The upper plate member 100 also is provided with a peripheral shoulder 106 which supports an annular resilient ring 108. The ring is interposed between the shoulder and the overlying locking ring 110. The latter is provided with a downwardly projecting circular wall 112 which telescopes freely over the upper portion of the upstanding wall 94 on the bottom plate member. Locking lugs 114 on the latter wall cooperate with offset locking slots 116 in the locking ring wall 112, in the manner in the embodiment illustrated in FIG. 2. A set screw 118 is provided in the locking ring wall for engagement with the bottom plate wall, to secure the locking ring releasably in locking position.

As in the embodiment previously described, openings are provided in the wall 94 for receiving the inlet conduit 46 and the outlet plug 44.

In the embodiment illustrated in FIG. 5 a circular wall 120 is welded to the upper scale plate 36. A spherical pressure transfer segment 122 is mounted at the center of the plate 36, as by means of the pivot stud 124. The segment freely supports a post 126 depending from the plate 128 which is adapted to be secured to the vehicle frame member 20, as by the bolts 130. An annular ring 132 is secured to and projects radially from the lower end of the post. The ring supports a resilient annular disk 134 which extends between the post 126 and wall 120. A cap member 136 overlies the disk and has an internally threaded wall 138 which engages external threads on the wall 120. The cap member thus serves to confine the disk 134 and, if desired, to preload the latter by tightening the cap member.

The bottom scale plate 37 may be secured directly to the underlying frame member 18. Alternatively, it may be secured by means of a duplicate assembly of the elements described above.

Figure 6:
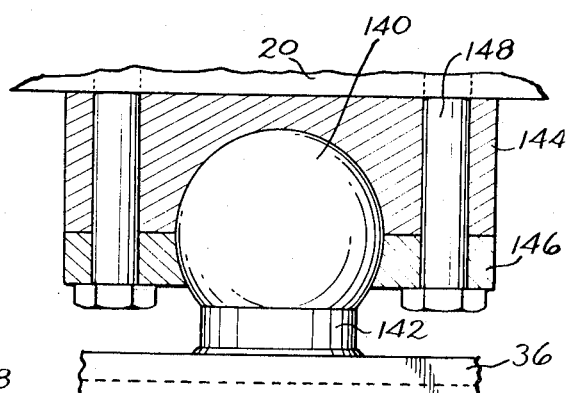
FIG. 6 is a fragmentary vertical section of a still further form of scale mounting.

In FIG. 6 the universal connecter is in the form of a ball-in-socket assembly. The ball 140 projects upwardly from a pressure transfer post 142 which is secured to a central portion of the upper plate 36 of a scale pad. The ball is received in the hollow portion of the socket member 144. A keeper ring 146 is secured to the socket member, below the ball, as by means of the securing bolts 148, to prevent separation of the ball and socket members, while accommodating a sufficient degree of relative universal movement therebetween. The bolts serve additionally to secure the socket member 144 to the upper vehicle frame member 20.

It will be understood that another ball-and-socket assembly may be interposed between a bottom plate 38 of the scale pad and the underlying frame member 18 of the vehicle, if desired.

Figure 7:
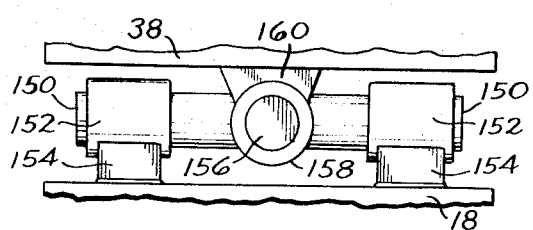
FIG. 7 is a side elevation of another form of scale mounting.

In FIG. 7 the universal connecter comprises a shaft 150 journaled at its opposite ends in bearings 152 the bases 154 of which are secured to the bottom frame member 18 of a vehicle. A cross-shaft 156 secured to the shaft 150 and projecting perpendicular thereto, is mounted rotatably in a bearing 158 the base 160 of which is secured, as by welding, to a central portion of a bottom plate 38 of a scale pad. If desired, a second universal connecter of this type may be interposed between the top plate 36 of the scale pad and the overlying top frame member 20 of the vehicle.

Figure 8:
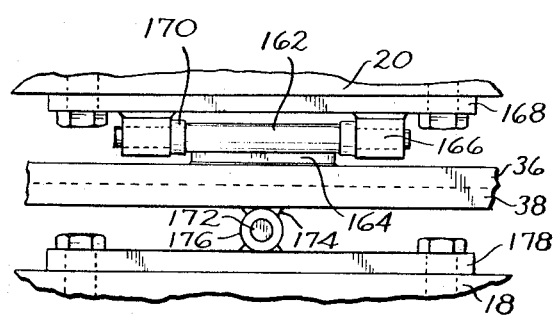
FIG. 8 is a side elevation of a still further modified form of scale mounting.

The embodiment illustrated in FIG. 8 is similar to that of FIG. 7 with the exception that the shafts 150 and 156 are separate from each other and each is positioned to interconnect a different one of the scale plates and adjacent vehicle frame members. Thus, shaft 162 is secured to pressure transfer plate 164 which, in turn, is secured to the central portion of the upper scale plate 36. The projecting ends of shaft 162 receive bearings 166 which are secured to mounting plate 168. This plate is adapted to be secured to the frame member 20, as by the bolts illustrated.

In order to afford a limited degree of lateral movement of the frame member 20 relative to the scale plate 36, rubber bushings 170 may be interposed between the end bearings 166 and the shoulders formed between the central, larger diameter portion of the shaft 162 and the smaller diameter end portions thereof.

The other shaft 172 is similar to shaft 162 and is secured to plate 174 secured to the central portion of the lower scale plate 38. The projecting ends of the shaft 172 receive bearings 176 secured to the mounting plate 178 adapted to be secured to the lower frame member 18, as by the bolts illustrated. Rubber bushings, similar to bushings 170 may be provided if desired.

From the foregoing it will be appreciated that by the present invention I have overcome two difficulties attending the use of the hydraulic scale disclosed in my earlier patent identified hereinbefore. By providing a universal connecter by which to mount the scale between relatively movable frame member of a vehicle, stresses on the scale plates are minimized and accuracy of load weight measurements is correspondingly improved. The universal connecter further allows the scale plates to be provided in minimum thickness, whereby to minimize the effects of variations in atmospheric temperature and thus correspondingly to improve the accuracy of load weight measurements. Certain of the universal connecters described herein also provide thermal thermal insulation for the scale, to still further improve the accuracy of load weight measurements.

Although the scale and mounting therefor have been described herein in connection with relatively movable frame members of a vehicle, it will be understood that the scale may be employed in other environments, such as a fixed platform-type scale, wherein the problem of stresses due to relative movement of frame members, are inconsequential, but wherein variations in atmospheric temperature are to be minimized. In such installations the scale described hereinbefore may be utilized without the universal connecters, it being required only that at least one of the scale plates have a maximum thickness in accordance with the ratio explained hereinbefore.

It will be apparent to those skilled in the art that various changes in the size, shape, type and number and arrangement of parts described hereinbefore may be made without departing from the spirit of this invention and the scope of the appended claims.

I claim:

1. In a hydraulic load weighing scale having upper and lower plates sealed together peripherally and containing hydraulic fluid between them, and means for mounting said scale between spaced upper and lower relatively movable members, said means comprising universal coupling means interconnecting the scale and at least one of the movable members, the improvement comprising a temperature compensation arrangement wherein the maximum thickness of at least one of the scale plates is determined by the ratio $T^2 = \frac{A}{K}$ nwherein T is the thickness of the plate, A is the area of the plate subjected to hydraulic pressure, and K is a constant ranging from about 400 to about 600.

2. The combination of claim 1 wherein K is approximately 450.

3. The combination of claim 1 wherein K is approximately 450 and said ratio determines the maximum thickness of both of the scale plates.

4. The combination of claim 1 wherein the universal coupling means includes:

a. a pair of connecting members joined together for relative universal movement;
b. means for securing one of said connecting members to one of the movable members; and
c. pressure transfer means operatively engaging one of said connecting members with the scale.

5. The combination of claim 4 where:

a. said one connecting member comprises one element of a ball-and-socket assembly;
b. said other connecting member comprises the other element of the ball-and-socket assembly; and
c. said pressure transfer means comprises a post on one element of the ball-in-socket assembly secured to the scale plate facing the adjacent movable member.

6. The combination of claim 4 wherein:

a. said one connecting member comprises a shaft journaled for rotation in bearing means adapted to be secured to one of the movable members;
b. said other connecting members includes a shaft secured perpendicular to the first named shaft for rotation therewith, and journaled in bearing means secured to the adjacent scale plate; and
c. said pressure transfer means comprises the end face of the bearing means which journals the second mentioned shaft.

7. The combination of claim 1 wherein the universal coupling means includes:

a. a pair of connecting members joined together for relative universal movement and supporting the scale between them;
b. means for securing one of said connecting members to the upper relatively movable member;
c. means for securing the other of said connecting members to the lower relatively movable member; and
d. at least one of the connection members including pressure transfer means engaging the scale plate facing the adjacent movable member.

8. The combination of claim 7 wherein:

a. said connecting members comprise plate members; and
b. lock means releasably interconnects the peripheries of the plate members for limited relative universal movement of the latter.

9. The combination of claim 7 including resilient bushing means interposed between at least one of the shafts and associated bearing means for affording limited relative movement therebetween in the axial direction of the shaft.

10. The combination of claim 1 wherein the universal coupling means includes:

a. a pair of connecting members joined together for relative universal movement and supporting the scale between them;
b. means for securing one of said connecting members to the upper relatively movable member;
c. means for securing the other of said connecting members to the lower relatively movable member; and
d. at least one of the connection members including pressure transfer means engaging the scale plate facing the adjacent movable member.

11. The combination of claim 10 wherein:

a. said connecting members comprise plate members; and
b. lock means releasably interconnects the peripheries of the plate members for limited relative universal movement of the latter.

12. The combination of claim 11 wherein the lock means comprises interlocking lug and slot means on the pair of plate members.

13. The combination of claim 11 wherein the lock means comprises a collar having spaced flanges confining said plate members freely therebetween.

14. The combination of claim 10 wherein said pressure transfer means comprises a resilient member interposed between the plate member and adjacent scale plate.

15. The combination of claim 14 wherein the resilient member comprises a rubber pad interposed between the scale plate and adjacent connecting member.

16. In a hydraulic load weighing scale comprising upper and lower plates sealed together peripherally and containing hydraulic fluid between them, the improvement comprising a temperature compensation arrangement wherein the maximum thickness of at least one of the scale plates is determined by the ratio $T^2 = \dfrac{A}{K}$ wherein T is the thickness of the plate, A is the area of the plate subjected to hydraulic pressure, and K is a constant ranging from about 400 to about 600.

17. The hydraulic load weighing scale of claim 16 wherein K is approximately 450 and said ratio determines the maximum thickness of both of the scale plates.